United States Patent
Lee et al.

(10) Patent No.: US 7,928,793 B2
(45) Date of Patent: Apr. 19, 2011

(54) VOLTAGE SELECTION CIRCUITRY

(75) Inventors: Shin-Woo Lee, Seoul (KR); Jin-Sang Kim, Gyeonggi-D (KR)

(73) Assignee: Core Logic, Inc., Seoul (KR)

(*) Notice: Subject to any disclaimer, the term of this patent is extended or adjusted under 35 U.S.C. 154(b) by 263 days.

(21) Appl. No.: 12/152,489

(22) Filed: May 14, 2008

(65) Prior Publication Data
US 2008/0284251 A1 Nov. 20, 2008

(30) Foreign Application Priority Data
May 14, 2007 (KR) .................. 10-2007-0046297

(51) Int. Cl.
*H03K 17/00* (2006.01)
(52) U.S. Cl. ............ 327/407; 327/99; 327/65; 327/427; 307/80; 307/81
(58) Field of Classification Search ............... 327/51, 327/63–65, 67, 99, 407, 408, 427; 307/75, 307/80, 81; 323/282, 285
See application file for complete search history.

(56) References Cited

U.S. PATENT DOCUMENTS
5,272,393 A * 12/1993 Horiguchi et al. .............. 327/63
6,642,750 B1 * 11/2003 Egan .............................. 327/63
* cited by examiner

*Primary Examiner* — Long Nguyen
(74) *Attorney, Agent, or Firm* — Edwards Angell Palmer & Dodge LLP; Kongsik Kim

(57) ABSTRACT

Techniques, systems and apparatus are described for providing a voltage selection circuitry and a DC-to-DC converter having such voltage selection circuitry. The voltage selection circuitry includes a first terminal voltage sensing unit that senses a voltage of a first terminal and a second terminal voltage sensing unit that senses a voltage of a second terminal. The voltage selection circuitry also includes a comparison unit connected to the first terminal voltage sensing unit and the second terminal voltage sensing unit. The comparison unit compares the voltage of the first terminal with the voltage of the second terminal and outputs a comparison signal indicating a difference between the sensed voltages of the first and second terminals. The voltage selection circuitry includes a selection unit that selects a higher voltage from the sensed voltages of the first and second terminals in response to the comparison signal.

19 Claims, 5 Drawing Sheets

VOLTAGE SELECTION CIRCUITRY

CLAIM OF PRIORITY

This application claims priority under 35 USC §119(a) to Korean Patent Application No. 10-2007-0046297 filed on May 14, 2007 in the Korean Intellectual Property Office, the entire contents of which are hereby incorporated by reference.

BACKGROUND

The present disclosure relates to voltage selection circuitry and a direct current-to-direct current (DC-to-DC) converter that includes the voltage selection circuitry. A DC-to-DC converter can increase or decrease an input voltage and output the increased or decreased input voltage to an output terminal. A DC-to-DC converter can be incorporated into various electronic devices, such as a portable electronic device and a display device. For example, a voltage needed to drive a passive matrix organic light emitting diode (OLED) display can be approximately 18 volts (V), but a source voltage of a lithium ion battery may be approximately 3.7 V. Thus, a boost type DC-to-DC converter may be needed to drive the passive OLED.

FIG. 1 is an example circuit diagram of a conventional DC-to-DC converter. The conventional DC-to-DC converter includes a switch unit 1 and a switch control circuit unit 2. The driving voltage for driving the switch control circuit unit 2 can be basically supplied from an output terminal of the switch unit 1.

For example, if the conventional DC-to-DC converter illustrated in FIG. 1 is a boost type DC-to-DC converter, a period in which an output voltage is lower than an input voltage inevitably occurs according to the characteristics of a rising curve of an output voltage of the DC-to-DC converter. However, if such a low output voltage is applied as a driving voltage for driving the switch control circuit unit 2, the operation of the switch control circuit unit 2 becomes unstable. In this case, it is difficult to control switching on or off of a p-channel metal-oxide-semiconductor (PMOS) type switch 11 and an n-channel metal-oxide-semiconductor (NMOS) type switch 12 included in the switch unit 1 at a desired level, thereby preventing a current of an inductor used in the boost type DC-to-DC converter from being controlled.

The PMOS type switch 11 and the NMOS type switch 12 of the switch unit 1 cannot be controlled because the driving voltage for driving the switch control circuit unit 2 is low. As a result, a current of the inductor in the DC-to-DC converter increases to a saturation point, and thus damaging the PMOS type switch 11.

SUMMARY

Techniques, systems and apparatus are described for implementing a DC-to-DC converter that provides stable operation, even during an initial stage, and increased efficiency. In addition, techniques, systems and apparatus are described for implementing voltage selection circuitry for stably operating a DC-to-DC converter even during an initial stage.

In one aspect, a voltage selection circuitry includes a first terminal voltage sensing unit to sense a voltage of a first terminal and a second terminal voltage sensing unit to sense a voltage of a second terminal. The voltage selection circuitry includes a comparison unit connected to the first terminal voltage sensing unit and the second terminal voltage sensing unit to compare the voltage of the first terminal with the voltage of the second terminal. Also, the comparison unit outputs a comparison signal indicating a difference between the voltages of the first and second terminals. The voltage selection circuitry includes a selection unit to receive the comparison signal and select a higher voltage from the sensed voltages of the first and second terminals in response to the received comparison signal.

Implementations can optionally include one or more of the following features. The selection unit may include a latch configuration including a pair of PMOS field effect transistors, a pair of NMOS field effect transistors, and an inverter.

The selection unit may include a first NMOS field effect transistor. The first NMOS field effect transistor may include a gate and a source that are electrically connected to an output terminal of the comparison unit and a base power source respectively. Also, the selection unit may include an inverter that includes one end electrically connected to the output terminal of the comparison unit. Also, the selection unit may include a second NMOS field effect transistor with a gate and a source electrically connected to the other end of the inverter and the base power source respectively. The selection unit may include a first PMOS field effect transistor with a gate and a drain electrically connected to a drain of the first NMOS field effect transistor and a drain of the second NMOS field effect transistor respectively. The selection unit may include a second PMOS field effect transistor with a gate and a drain electrically connected to the drain of the second NMOS field effect transistor and the drain of the first NMOS field effect transistor. The selection unit may include a third PMOS field effect transistor with a gate electrically connected to the drain of the first NMOS field effect transistor. The third PMOS field effect transistor also includes a drain electrically connected to the first terminal, and a source electrically connected to the source of the first PMOS field effect transistor and the source of the second PMOS field effect transistor. The selection unit may include a fourth PMOS field effect transistor with a gate electrically connected to the drain of the second NMOS field effect transistor, a drain electrically connected to the second terminal, and a source electrically connected to the source of the first PMOS field effect transistor and the source of the second PMOS field effect transistor.

The voltage selection circuitry may further include a first buffer with one end electrically connected to the drain of the first NMOS field effect transistor and the other end electrically connected to the gate of the third PMOS field effect transistor. The voltage selection circuitry may also include a second buffer with one end electrically connected to the drain of the second NMOS field effect transistor and the other end electrically connected to the gate of the fourth PMOS field effect transistor.

The first and second buffers may use the same bias voltage. For example, a low-level bias terminal of the first buffer and a low-level bias terminal of the second buffer may be electrically connected to the base power source. Also, a high level bias terminal of the first buffer and a high-level bias terminal of the second buffer may be electrically connected to the source of the first PMOS field effect transistor and the source of the second PMOS field effect transistor respectively.

The first terminal may include an input terminal and the second terminal may include an output terminal. The comparison unit may output a high-level signal or a low-level signal as the comparison signal. The comparison unit outputs the high-level signal when the voltage of the first terminal is higher than the voltage of the second terminal. Alternatively, the comparison unit outputs the low-level signal when the voltage of the first terminal is lower than the voltage of the second terminal. By outputting the high-level or low-level comparison signal, the selection unit can output the higher voltage from the voltages of the first and second terminals.

In another aspect, a DC-to-DC converter comprises a voltage selection circuitry and a switch control circuitry electrically connected to the voltage selection circuitry. The switch control circuitry is configured to be driven by a voltage selected by the voltage selection circuitry. The DC-to-DC converter includes a switch unit electrically connected to the switch control circuitry. The switch unit is to output a voltage of a first terminal to a second terminal under control of the switch control circuitry. The voltage selection circuitry includes a first terminal voltage sensing unit to sense the voltage of the first terminal and a second terminal voltage sensing unit to sense a voltage of the second terminal. The voltage selection circuitry includes a comparison unit electrically connected to the first terminal voltage sensing unit and the second terminal voltage sensing unit to compare the voltage of the first terminal with the voltage of the second terminal and output a comparison signal indicating a difference between the voltages of the first and second terminals. The voltage selection circuitry includes a selection unit to receive the comparison signal and select a higher voltage from the sensed voltages of the first and second terminals in response to the comparison signal.

Implementations may optionally include one or more of the following features. The selection unit may include a pair of PMOS field effect transistors in a latch configuration.

The selection unit may include a first NMOS field effect transistor with a gate and a source electrically connected to an output terminal of the comparison unit and a base power source respectively. The selection unit may also include an inverter with one end connected to the output terminal of the comparison unit. The selection unit may include a second NMOS field effect transistor with a gate and a source electrically connected to the other end of the inverter and the base power source respectively. The selection unit can include a first PMOS field effect transistor with a gate and a drain electrically connected to a drain of the first NMOS field effect transistor and a drain of the second NMOS field effect transistor. The selection unit can include a second PMOS field effect transistor with a gate and a drain electrically connected to the drain of the second NMOS field effect transistor and the drain of the first NMOS field effect transistor. The selection unit can include a third PMOS field effect transistor with a gate electrically connected to the drain of the first NMOS field effect transistor, a drain electrically connected to the first terminal, and a source electrically connected to the source of the first PMOS field effect transistor and the source of the second PMOS field effect transistor. The selection unit can include a fourth PMOS field effect transistor with a gate electrically connected to the drain of the second NMOS field effect transistor, a drain electrically connected to the second terminal, and a source electrically connected to the source of the first PMOS field effect transistor and the source of the second PMOS field effect transistor.

The DC-to-DC converter may further include a first buffer with one end electrically connected to the drain of the first NMOS field effect transistor and the other end electrically connected to the gate of the third PMOS field effect transistor. The DC-to-DC converter may include a second buffer with one end electrically connected to the drain of the second NMOS field effect transistor and the other end electrically connected to the gate of the fourth PMOS field effect transistor.

A low-level bias terminal of the first buffer and a low-level bias terminal of the second buffer can be electrically connected to the base power source, and a high level bias terminal of the first buffer and a high-level bias terminal of the second buffer can be electrically connected to the source of the first PMOS field effect transistor and the source of the second PMOS field effect transistor respectively.

The first terminal may be an input terminal and the second terminal may be an output terminal. The comparison unit may output a high-level signal or a low-level signal as the comparison signal. The comparison unit outputs the high-level signal when the voltage of the first terminal is higher than the voltage of the second terminal. The comparison unit may output the low-level signal when the voltage of the first terminal is lower than the voltage of the second terminal. Outputting the high or low-level comparison signal enables the selection unit to output a higher voltage from the sensed voltages of the first and second terminals, and the voltage selection circuitry can apply the higher voltage to the switch control circuitry from the voltages of the first and second terminals.

In another aspect, a voltage of a first terminal and a voltage of a second terminal are detected. The detected voltages of the first and second terminals are compared. A comparison signal is outputted based on the comparison. The comparison signal includes a high-level signal to indicate that the voltage of the first terminal is higher than the voltage of the second terminal or a low-level signal to indicate that the voltage of the first terminal is lower than the voltage of the second terminal. At least two switches associated with the first terminal are turned on when the high-level comparison signal is outputted. Alternatively, at least two switches associated with the second terminal are turned on when the low-level comparison signal is outputted. The voltage of the first terminal or the voltage of the second terminal is selected based on the process of turning on the at least two switches associated with the first terminal or the at least two switches associated with the second terminal. The selected voltage of the first terminal or the selected voltage of the second terminal is applied as a driving voltage.

Implementations can optionally include one or more of the following features. A time to turn on one of the at least two switches associated with the first terminal can be reduced using a first buffer. Alternatively, a time to turn on one of the at least two switches associated with the second terminal can be reduced using a second buffer. Applying the selected voltage can include applying the selected voltage of the first terminal or the selected voltage of the second terminal as a driving voltage to a switch controller circuitry. Also, turning on the at least two switches associated with the first terminal can include turning on a NMOS field effect transistor and a PMOS field effect transistor. Turning on the at least two switches associated with the second terminal can include turning on another NMOS field effect transistor and another PMOS field effect transistor.

BRIEF DESCRIPTION OF THE DRAWINGS

Like reference symbols and designations in the various drawings indicate like elements.

DETAILED DESCRIPTION

Techniques, systems and apparatus are described for implementing voltage selection circuitry. In particular, a DC-to-DC converter that includes the voltage selection circuitry is described.

Figure 1:
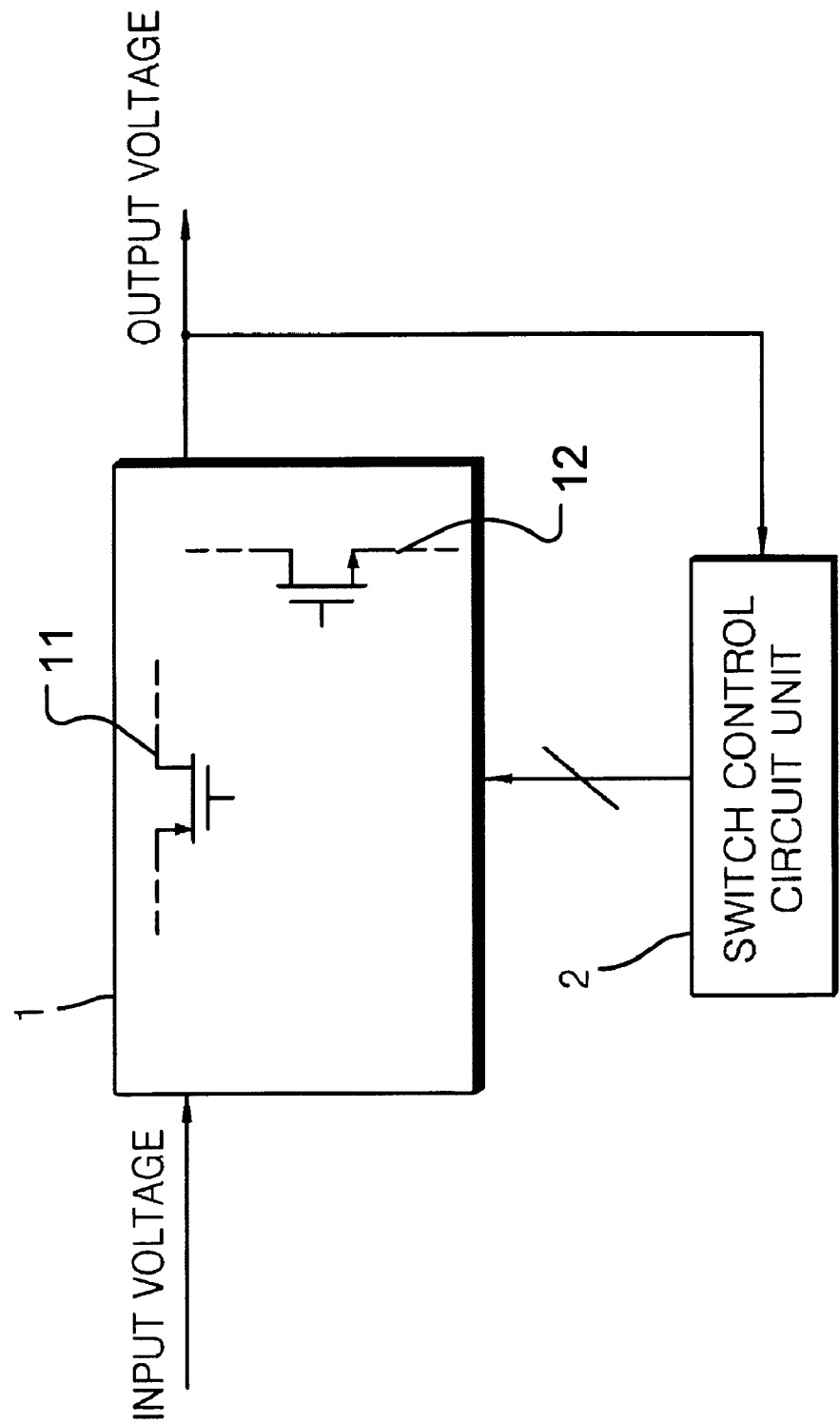
FIG. 1 is a circuit diagram showing an example of a conventional DC-to-DC converter.
Figure 2:
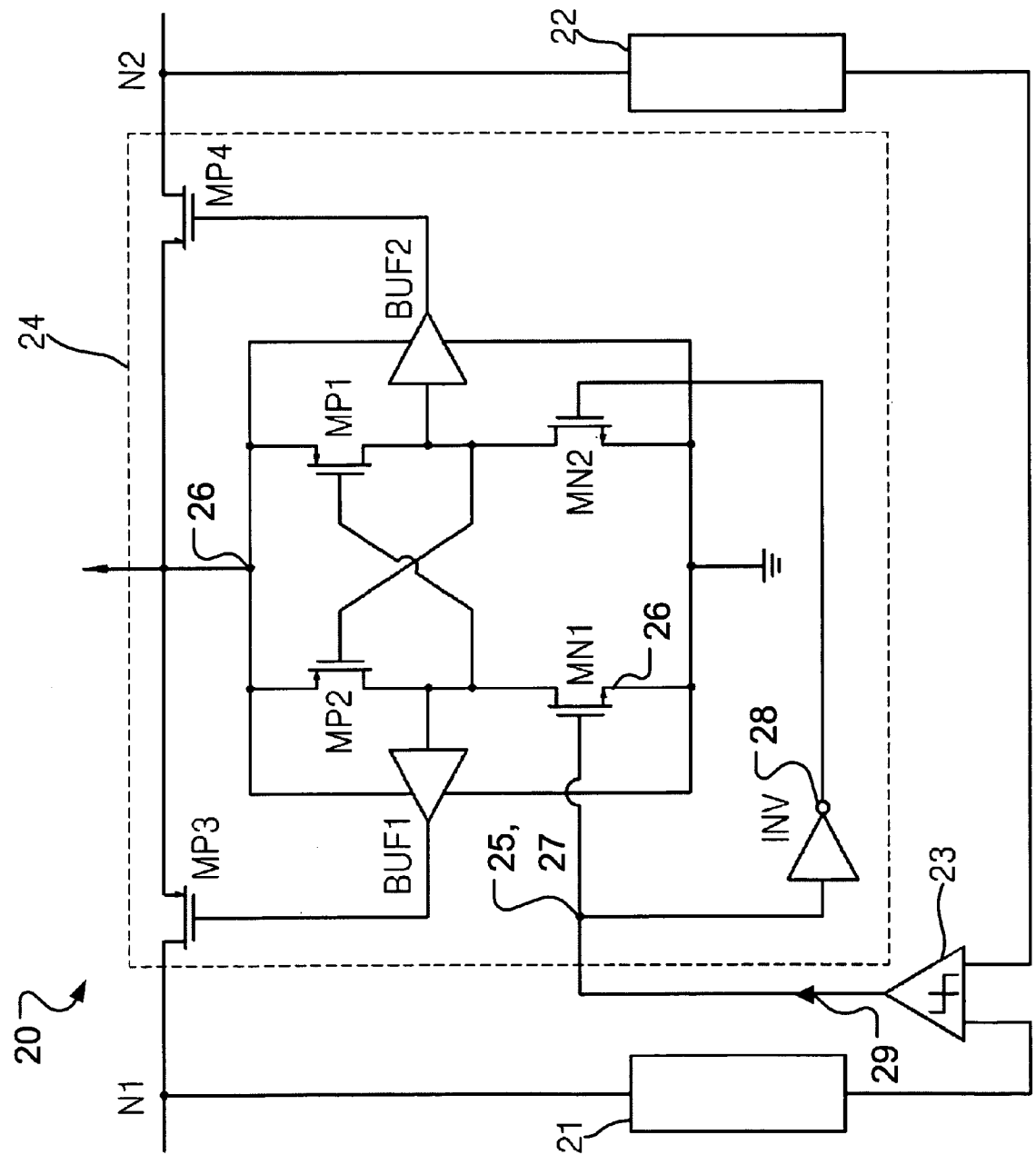
FIG. 2 is a circuit diagram showing an example of voltage selection circuitry as described in this specification.

FIG. 2 is a circuit diagram showing an example of voltage selection circuitry 20 suitable for a DC-to-DC converter as described in this specification. The voltage selection circuitry 20 includes a first terminal voltage sensing unit 21, a second terminal voltage sensing unit 22, a comparison unit 23 and a selection unit 24.

The first terminal voltage sensing unit 21 senses a voltage of a first terminal N1 and outputs the result of the sensed voltage to the comparison unit 23.

The second terminal voltage sensing unit 22 senses a voltage of a second terminal N2 and outputs the result of the sensed voltage to the comparison unit 23.

The comparison unit 23 compares the result of the sensed voltage received from the first terminal voltage sensing unit 21 with the result of the sensed voltage received from the second terminal voltage sensing unit 22. The comparison unit 23 can output a result of the comparison as a comparison signal to indicate any detected difference between the two sensed voltages of the first and second terminals N1 and N2 respectively. The comparison unit 23 may output a high-level comparison signal when the voltage of the first terminal N1 is detected to be higher than the voltage of the second terminal N2. Alternatively, the comparison unit 23 may output a low-level comparison signal when the voltage of the first terminal N1 is detected to be lower than the voltage of the second terminal N2.

The selection unit 24 selects a higher one of the two sensed voltages of the first and second terminals N1 and N2 in response to the comparison signal received from the comparison unit 23.

The selection unit 24 may include a first NMOS field effect transistor MN1, an inverter INV, a second NMOS field effect transistor MN2, a first PMOS field effect transistor MP1, a second PMOS field effect transistor MP2, a third PMOS field effect transistor MP3 and a fourth PMOS field effect transistor MP4.

The gate and source of the first NMOS field effect transistor MN1 are electrically connected to an output terminal 25 of the comparison unit 23 and a base power source 26 respectively. One end 27 of the inverter INV is electrically connected to the output terminal 25 of the comparison unit 23. The gate and source of the second NMOS field effect transistor MN2 are electrically connected to the other end 28 of the inverter INV and the base power source 26 respectively. The gate and drain of the first PMOS field effect transistor MP1 are electrically connected to the drain of the first NMOS field effect transistor MN1 and the drain of the second NMOS field effect transistor MN2 respectively. The gate and drain of the second PMOS field effect transistor MP2 are electrically connected to the drain of the second NMOS field effect transistor MN2 and the drain of the first NMOS field effect transistor MN1 respectively. The gate and drain of the third PMOS field effect transistor MP3 are electrically connected to the drain of the first NMOS field effect transistor MN1 and the first terminal N1 respectively. The source of the third PMOS field effect transistor MP3 is electrically connected to the source of the first PMOS field effect transistor MP1 and the source of the second PMOS field effect transistor MP2. The gate and drain of the fourth PMOS field effect transistor MP4 are electrically connected to the drain of the second NMOS field effect transistor MN2 and the second terminal N2 respectively. The source of the fourth PMOS field effect transistor MP4 is electrically connected to the source of the first PMOS field effect transistor MP1 and the source of the second PMOS field effect transistor MP2.

The comparison signal output 29 from the comparison unit 23 is applied to the gate of the first NMOS field effect transistor MN1, and to the gate of the second NMOS field effect transistor MN2 via the inverter INV. A latch is formed by combining together the first NMOS field effect transistor MN1, the second NMOS field effect transistor MN2, the first PMOS field effect transistor MP1, and the second PMOS field effect transistor MP2. The two outputs of the formed latch are opposite to each other. Thus, the manner of controlling the third PMOS field effect transistor MP3 is reverse of the manner of controlling the fourth or third PMOS field effect transistor MP4.

The process for controlling the NMOS and PMOS field effect transistors can be described with respect to the detected output signal 29 from the comparison unit 23. For example, the control process differs depending on whether the detected output signal 29 is high or low, in binary sense.

When the voltage of the first terminal N1 is detected to be higher than the voltage of the second terminal N2, the comparison signal output 29 from the comparison unit 23 is detected to be high. Under this condition, the first NMOS field effect transistor MN1 is turned on and the second NMOS field effect transistor MN2 is maintained at an "off" state. Thus, the gate of the third PMOS field effect transistor MP3 is electrically connected to the base power source 26 via the first NMOS field effect transistor MN1 to turn on the third PMOS field effect transistor MP3. In this case, the voltage of the first terminal N1 is selected as the output voltage 26.

When the voltage of the first terminal N1 is detected to be lower than the voltage of the second terminal N2, the comparison signal output 29 from the comparison unit 23 is detected to be low. The first NMOS field effect transistor MN1 is turned off and the second NMOS field effect transistor MN2 is turned on. Thus, the gate of the fourth PMOS field effect transistor MP4 is electrically connected to the base power source 26 via the second NMOS field effect transistor MN2 to turn on the fourth PMOS field effect transistor MP4. In this case, the voltage of the second terminal N2 is selected as the output voltage 26.

In some implementations, the voltage selection circuitry 20 may further include a first buffer BUF1 and a second buffer BUF2. These buffers BUF1 and BUF2 can reduce a time required to turn on the third PMOS field effect transistor MP3 and the fourth PMOS field effect transistor MP4.

One end of the first buffer BUF1 is electrically connected to the drain of the first NMOS field effect transistor MN1 and the other end of the first buffer BUF1 is electrically connected to the gate of the third PMOS field effect transistor MP3. One end of the second buffer BUF2 is electrically connected to the drain of the second NMOS field effect transistor MN2 and the other end of the second buffer BUF2 is electrically connected to the gate of the fourth PMOS field effect transistor MP4. The first buffer BUF1 and the second buffer BUF2 can respectively reduce a time required to turn on the third PMOS field effect transistor MP3 and the fourth PMOS field effect transistor MP4.

A low-level bias terminal of the first buffer BUF1 and a low-level bias terminal of the second buffer BUF2 can be electrically connected to the base power source 26. In addition, a high-level bias terminal of the first buffer BUF1 and a high-level bias terminal of the second buffer BUF2 can be electrically connected to the source of the first PMOS field effect transistor MP1 and the source of the second PMOS field effect transistor MP2. Thus, the latch that includes the first NMOS field effect transistor MN1, the second NMOS field effect transistor MN2, the first PMOS field effect transistor MP1, and the second PMOS field effect transistor MP2; and the first and second buffers BUF1 and BUF2 can use the same bias voltage.

Figure 3:
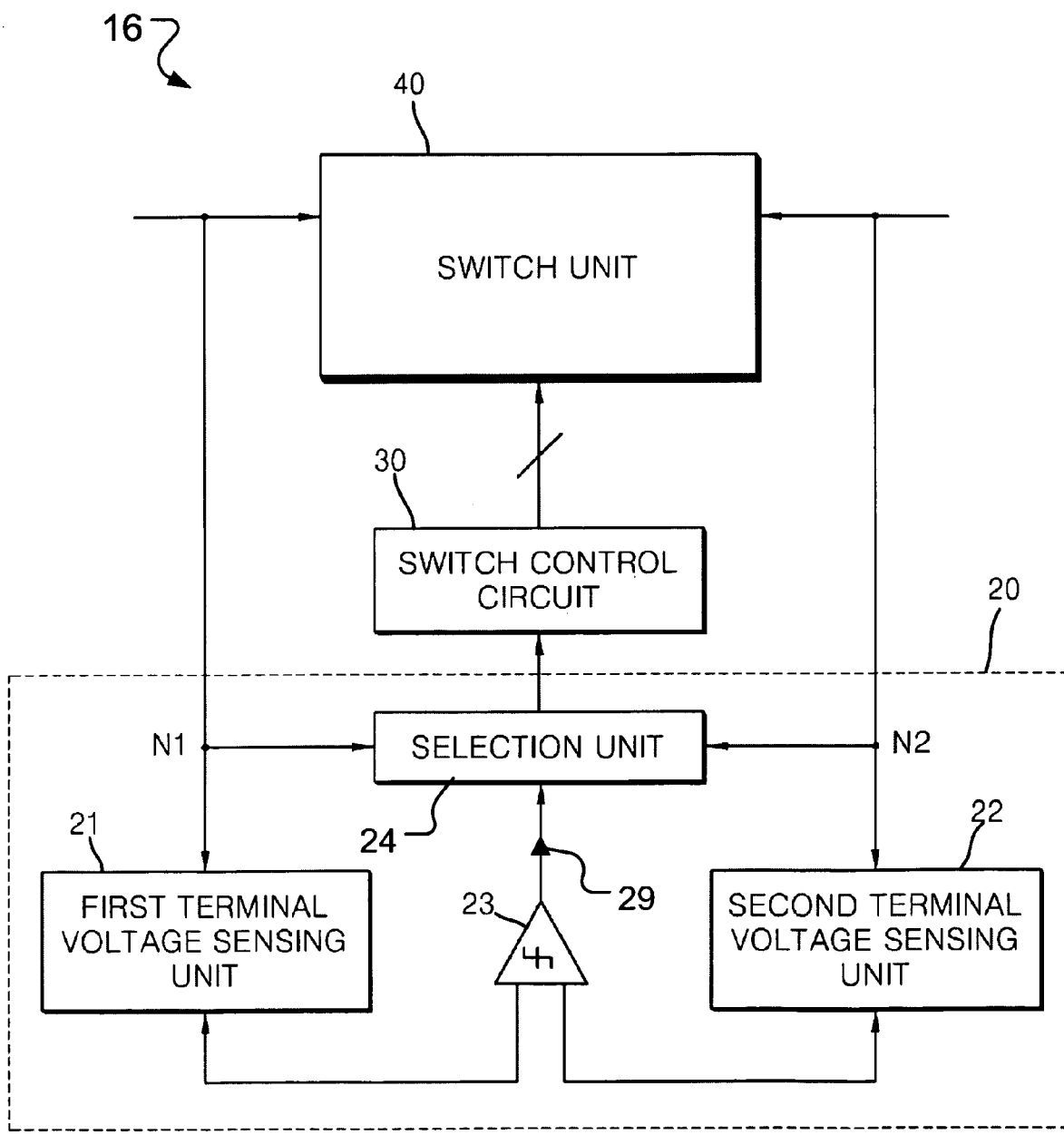
FIG. 3 is a circuit diagram showing an example of a DC-to-DC converter as described in this specification.

FIG. 3 is a circuit diagram showing an example of a DC-to-DC converter 31 as described in this specification. The DC-to-DC converter 31 includes a voltage selection circuitry 20, a switch control circuitry 30 and a switch unit 40. The voltage selection circuitry 20 can be implemented as shown in FIG. 2, and other implementations can also be used. The switch control circuitry 30 can be driven based on a voltage selected by the voltage selection circuitry 20. The switch unit 40 outputs a voltage of a first terminal N1 to a second terminal N2 under control of the switch control circuitry 30. The voltage selection circuitry 20 includes a first terminal voltage sensing unit 21, a second terminal voltage sensing unit 22, a comparison unit 23 and a selection unit 24. The first terminal voltage sensing unit 21 can sense the voltage of the first terminal N1. The second terminal voltage sensing unit 22 can sense the voltage of the second terminal N2. The comparison unit 23 can compare the sensed voltages of the first and second terminals N1 and N2 and output a comparison signal 29. The outputted comparison signal 29 indicates the difference between the sensed voltages of the first and second terminals N1 and N2. The selection unit 24 can select a higher one of the sensed voltages of the first and second terminals N1 and N2 in response to the outputted comparison signal 29.

The switch control circuitry 30 and the switch unit 40 can be constructed in various configurations. In one implementations, for example, a bulk of a PMOS type switch (not shown) included in the switch unit 40 is electrically connected to one of the first terminal N1 and the second terminal N2. From the two terminals N1 and N2, the terminal having the higher voltage is selected and connected to the PMOS type switch.

The DC-to-DC converter 16 as described in this specification can select a higher voltage from the voltages of the first terminal N1 and the second terminal N2. The selected higher voltage can be applied as a driving voltage to the switch control circuitry 30. When the first terminal N1 is an input terminal with a voltage higher than the second terminal N2 operating as an output terminal, during an initial operation of the DC-to-DC converter 16, the voltage of the input terminal is applied as the driving voltage. However, the voltage of the output terminal is applied when the voltage of the output terminal is higher than the voltage of the input terminal. In such manner, the efficiency and operating stability of the DC-to-DC converter can be increased.

Figure 4:
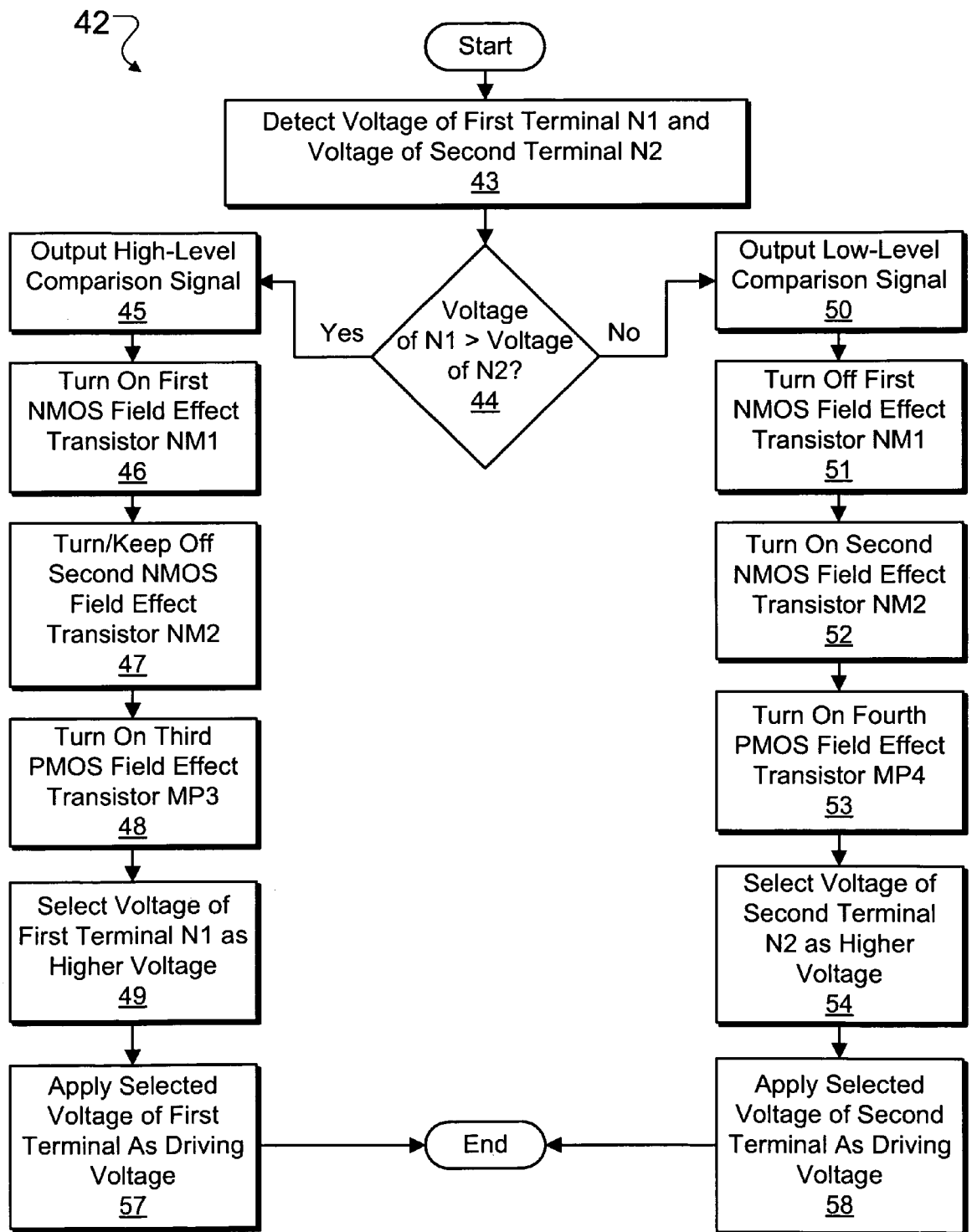
FIGS. 4 and 5 show an example process 42 for performing voltage selection.
Figure 5:
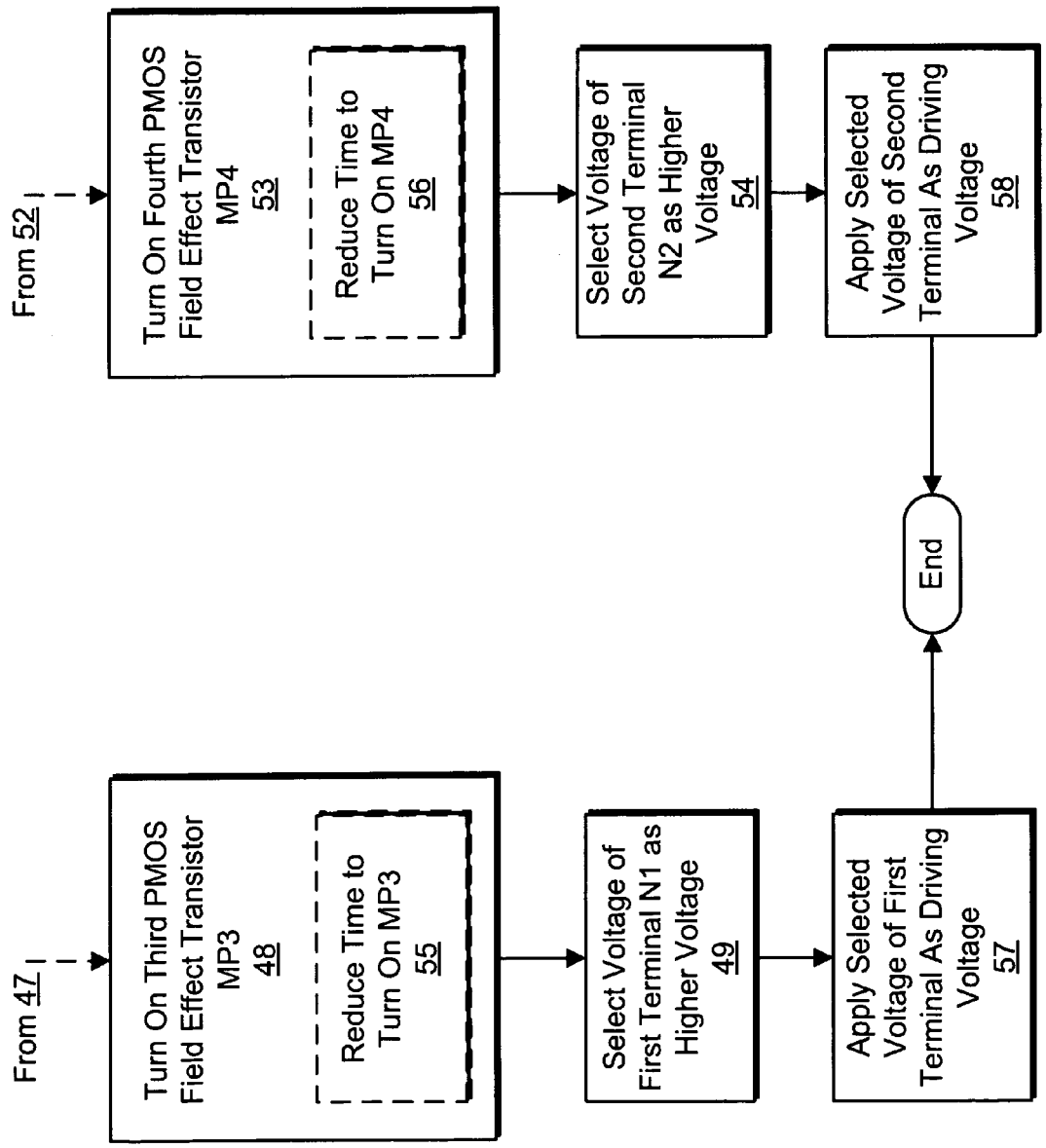

FIGS. 4 and 5 show an example process 42 for performing voltage selection in a DC-to-DC converter of FIG. 3. The voltage of the first terminal N1 and the voltage of the second terminal N2 are detected (43). The detected voltages of the first and second terminals N1 and N2 are compared (44). When the voltage of the first terminal N1 is detected to be higher than the voltage of the second terminal N2, a high-level comparison signal 29 is outputted from the comparison unit 23 (45). The high-level comparison signal 29 turns on the first NMOS field effect transistor MN1 (46) and maintains the second NMOS field effect transistor MN2 at an "off" state (47). Turning on the first NMOS field effect transistor MN1 electrically connects the gate of the third PMOS field effect transistor MP3 to the base power source 26, and thus MP3 is turned on (48). The voltage of the first terminal N1 is selected to be the higher voltage than the second terminal and thus selected to be outputted to the switch control circuitry 30 (49).

The selected voltage of first terminal N1 is applied as the driving voltage to the switch control circuitry 30 (57).

When the voltage of the first terminal N1 is detected to be lower than the voltage of the second terminal N2, a low-level comparison signal 29 is outputted from the comparison unit 23 (50). The low-level comparison signal 29 turns off MN1 (51) and turns on MN2 (52). Turning on MN2 causes the gate of the fourth PMOS field effect transistor MP4 to be electrically connected to the base power source 26, and thus MP4 is turned on (53). The voltage of the second terminal N2 is selected as the higher voltage than N1 (54) and thus selected to be outputted to the switch control circuitry 30. The selected voltage of second terminal N2 is applied as the driving voltage to the switch control circuitry 30 (57).

In some implementations, the first buffer BUF1 can be connected to NM1 and MP3, as described with respect to FIG. 3 above, to reduce the time for turning on MP3 (55). Also, the second buffer BUF2 can be connected to NM2 and MP4, as described with respect to FIG. 3 above, to reduce the time required to turn on MP4 (56).

As described with respect to FIGS. 1-5 above, the voltage selection circuitry 20 as described in this specification can be configured and operated to improve the efficiency and operating stability of any DC-to-DC converter. In addition, the voltage selection circuitry can accurately detect and select a higher one of the sensed voltages of the input terminal and the output terminal.

While this specification contains many specifics, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

Only a few implementations and examples are described and other implementations, enhancements and variations can be made based on what is described and illustrated in this application.

What is claimed is:
1. A voltage selection circuitry comprising:
a first terminal voltage sensing unit to sense a voltage of a first terminal;
a second terminal voltage sensing unit to sense a voltage of a second terminal;
a comparison unit electrically connected to the first terminal voltage sensing unit and the second terminal voltage sensing unit to compare the sensed voltage of the first terminal with the sensed voltage of the second terminal, and output a comparison signal indicating a difference between the sensed voltages of the first and second terminals; and a selection unit electrically connected to the comparison unit to receive the comparison signal from the comparison unit, and select a higher voltage from the sensed voltages of the first and second terminals in response to the received comparison signal, wherein the selection unit comprises a pair of PMOS field effect transistors in a latch configuration.

2. The voltage selection circuitry of claim 1, wherein the selection unit comprises the pair of PMOS field effect transistors, a pair of NMOS field effect transistors, and an inverter arranged to form the latch configuration.

3. The voltage selection circuitry of claim 1, wherein the selection unit comprises:
a first NMOS field effect transistor that includes a gate and a source electrically connected to an output terminal of the comparison unit and a base power source respectively;
an inverter that includes one end electrically connected to the output terminal of the comparison unit; and
a second NMOS field effect transistor that includes a gate and a source electrically connected to other end of the inverter and the base power source respectively,
wherein the pair of PMOS field effect transistors in the latch configuration comprises:
a first PMOS field effect transistor that includes a gate and a drain electrically connected to a drain of the first NMOS field effect transistor and a drain of the second NMOS field effect transistor respectively; and
a second PMOS field effect transistor that includes a gate and a drain electrically connected to the drain of the second NMOS field effect transistor and the drain of the first NMOS field effect transistor respectively,
wherein the selection unit further comprises:
a third PMOS field effect transistor that includes a gate electrically connected to the drain of the first NMOS field effect transistor, a drain electrically connected to the first terminal, and a source electrically connected to the source of the first PMOS field effect transistor and the source of the second PMOS field effect transistor; and
a fourth PMOS field effect transistor that includes a gate electrically connected to the drain of the second NMOS field effect transistor, a drain electrically connected to the second terminal, and a source electrically connected to the source of the first PMOS field effect transistor and the source of the second PMOS field effect transistor.

4. The voltage selection circuitry of claim 3, further comprising:
a first buffer that includes one end electrically connected to the drain of the first NMOS field effect transistor, and other end electrically connected to the gate of the third PMOS field effect transistor; and
a second buffer that includes one end electrically connected to the drain of the second NMOS field effect transistor, and other end electrically connected to the gate of the fourth PMOS field effect transistor.

5. The voltage selection circuitry of claim 4, wherein the first and second buffers use the same bias voltage.

6. The voltage selection circuitry of claim 4, wherein a low-level bias terminal of the first buffer and a low-level bias terminal of the second buffer are electrically connected to the base power source; and a high level bias terminal of the first buffer and a high-level bias terminal of the second buffer are electrically connected to the source of the first PMOS field effect transistor and the source of the second PMOS field effect transistor respectively.

7. The voltage selection circuitry of claim 4, wherein the first terminal comprises an input terminal and the second terminal comprises an output terminal; and the comparison unit is configured to output a high-level signal or a low-level signal as the comparison signal, where the comparison unit outputs the high-level signal when the voltage of the first terminal is higher than the voltage of the second terminal, and the comparison unit outputs the low-level signal when the voltage of the first terminal is lower than the voltage of the second terminal to enable the selection unit to output the higher voltage selected from the sensed voltages of the first and second terminals.

8. A direct current-to-direct current (DC-to-DC) converter comprising:
voltage selection circuitry;
switch control circuitry electrically connected to the voltage selection circuitry, wherein the switch control circuitry is to be driven by a voltage selected by the voltage selection circuitry; and
a switch unit electrically connected to the switch control circuitry to output a voltage of a first terminal of the voltage selection circuitry to a second terminal of the voltage selection circuitry under control of the switch control circuitry, wherein the voltage selection circuitry comprises:
a first terminal voltage sensing unit to sense the voltage of the first terminal;
a second terminal voltage sensing unit to sense a voltage of the second terminal;
a comparison unit electrically connected to the first terminal voltage sensing unit and the second terminal voltage sensing unit to compare the voltage of the first terminal of the voltage selection circuitry with the voltage of the second terminal of the voltage selection circuitry, and output a comparison signal indicating a difference between the sensed voltages of the first and second terminals; and
a selection unit electrically connected to the comparison unit to receive the comparison signal, and select a higher voltage from the sensed voltages of the first and second terminals in response to the received comparison signal.

9. The DC-to-DC converter of claim 8, wherein the selection unit comprises a pair of PMOS field effect transistors in a latch configuration.

10. The DC-to-DC converter of claim 8, wherein the selection unit comprises a latch configuration including a pair of PMOS field effect transistors, a pair of NMOS field effect transistors, and an inverter.

11. The DC-to-DC converter of claim 8, wherein the selection unit comprises:
a first NMOS field effect transistor that includes a gate and a source electrically connected to an output terminal of the comparison unit and a base power source respectively;
an inverter that includes one end electrically connected to the output terminal of the comparison unit;
a second NMOS field effect transistor that includes a gate and a source electrically connected to other end of the inverter and the base power source respectively;
a first PMOS field effect transistor that includes a gate and a drain electrically connected to a drain of the first NMOS field effect transistor and a drain of the second NMOS field effect transistor respectively;

a second PMOS field effect transistor that includes a gate and a drain electrically connected to the drain of the second NMOS field effect transistor and the drain of the first NMOS field effect transistor respectively;

a third PMOS field effect transistor that includes a gate electrically connected to the drain of the first NMOS field effect transistor, a drain electrically connected to the first terminal, and a source electrically connected to the source of the first PMOS field effect transistor and the source of the second PMOS field effect transistor; and a fourth PMOS field effect transistor that includes a gate electrically connected to the drain of the second NMOS field effect transistor, a drain electrically connected to the second terminal, and a source electrically connected to the source of the first PMOS field effect transistor and the source of the second PMOS field effect transistor.

12. The DC-to-DC converter of claim 11, further comprising:

a first buffer that includes one end electrically connected to the drain of the first NMOS field effect transistor, and other end electrically connected to the gate of the third PMOS field effect transistor; and a second buffer that includes one end electrically connected to the drain of the second NMOS field effect transistor, and other end electrically connected to the gate of the fourth PMOS field effect transistor.

13. The DC-to-DC converter of claim 12, wherein the first and second buffers use the same bias voltage.

14. The DC-to-DC converter of claim 13, wherein a low-level bias terminal of the first buffer and a low-level bias terminal of the second buffer are electrically connected to the base power source, and a high level bias terminal of the first buffer and a high-level bias terminal of the second buffer are electrically connected to the source of the first PMOS field effect transistor and the source of the second PMOS field effect transistor respectively.

15. The DC-to-DC converter of claim 12, wherein the first terminal of the voltage selection circuitry comprises an input terminal and the second terminal of the voltage selection circuitry comprises an output terminal, and the comparison unit is configured to output one of a high-level signal and a low-level signal as the comparison signal, where the comparison unit outputs the high-level signal when the voltage of the first terminal is higher than the voltage of the second terminal, and the comparison unit outputs the low-level signal when the voltage of the first terminal is lower than the voltage of the second terminal to enable the selection unit to output the higher voltage selected from the sensed voltages of the first and second terminals to the switch control circuitry.

16. A method comprising:

detecting a voltage of a first terminal and a voltage of a second terminal;

comparing the detected voltages of the first and second terminals;

outputting a comparison signal based on the comparison, wherein the comparison signal includes a high-level signal to indicate that the voltage of the first terminal is higher than the voltage of the second terminal or a low-level signal to indicate that the voltage of the first terminal is lower than the voltage of the second terminal;

turning on at least two switches associated with the first terminal when the high-level comparison signal is outputted;

turning on at least two switches associated with the second terminal when the low-level comparison signal is outputted;

selecting the voltage of the first terminal or the voltage of the second terminal based on the process of turning on the at least two switches associated with the first terminal or the at least two switches associated with the second terminal; and applying the selected voltage of the first terminal or the selected voltage of the second terminal as a driving voltage.

17. The method of claim 16, further comprising:

reducing a time to turn on one of the at least two switches associated with the first terminal using a first buffer; or reducing a time to turn on one of the at least two switches associated with the second terminal using a second buffer.

18. The method of claim 16, wherein applying the selected voltage comprises applying the selected voltage of the first terminal or the selected voltage of the second terminal as a driving voltage to a switch controller circuitry.

19. The method of claim 16, wherein:

turning on the at least two switches associated with the first terminal comprises turning on a NMOS field effect transistor and a PMOS effect transistor; and turning on the at least two switches associated with the second terminal comprises turning on another NMOS field effect transistor and another PMOS field effect transistor.

* * * * *